United States Patent
Weyker

(10) Patent No.: US 6,955,189 B1
(45) Date of Patent: Oct. 18, 2005

(54) GARDEN HOSE ASSEMBLY

(76) Inventor: Rich J. Weyker, 4020 Bellaire #18, White Bear Lake, MN (US) 55110

( * ) Notice: Subject to any disclaimer, the term of this patent is extended or adjusted under 35 U.S.C. 154(b) by 0 days.

(21) Appl. No.: 10/739,977

(22) Filed: Dec. 19, 2003

(51) Int. Cl.[7] .............................................. F16L 55/00
(52) U.S. Cl. ....................... 138/104; 138/137; 138/119; 138/126
(58) Field of Search ................... 138/119, 104, 123, 138/126, 137, 140, 178; 116/205, DIG. 17

(56) References Cited

U.S. PATENT DOCUMENTS

| | | | |
|---|---|---|---|
| 1,301,354 A * | 4/1919 | Baird ........................ | 138/119 |
| 3,812,815 A * | 5/1974 | Kuenzel .................... | 116/28 R |
| 3,989,572 A * | 11/1976 | Swartz ....................... | 156/252 |
| 4,159,595 A * | 7/1979 | Dalle et al. ................. | 47/2 |
| 4,275,768 A | 6/1981 | Riggs et al. ............... | 138/104 |
| 4,463,779 A | 8/1984 | Wink et al. ................ | 138/125 |
| 4,467,837 A * | 8/1984 | Baker ......................... | 138/119 |
| 4,474,217 A | 10/1984 | DeMarse et al. .......... | 138/137 |
| 4,478,661 A | 10/1984 | Lewis ........................ | 138/119 X |
| 4,844,000 A * | 7/1989 | Clement .................... | 116/205 |
| 5,027,741 A * | 7/1991 | Smith et al. ............... | 116/205 |
| 5,182,954 A * | 2/1993 | Menheere .................. | 73/864.45 |
| 5,477,888 A | 12/1995 | Mezzalira .................. | 138/125 |
| 5,555,913 A | 9/1996 | Waidele et al. ............ | 138/104 |
| 5,647,401 A * | 7/1997 | Nobori ....................... | 138/126 |
| 5,983,949 A | 11/1999 | Pohle ......................... | 138/104 |
| 6,079,135 A * | 6/2000 | Ruiz ........................... | 40/316 |

FOREIGN PATENT DOCUMENTS

DE  29617747 U1 *  5/1997  ............ F16L 11/04

* cited by examiner

*Primary Examiner*—Patrick Brinson

(57) ABSTRACT

A garden hose assembly includes an elongated and flexible tubular member that includes an open first end, an open second end and a peripheral wall extending between the first and second open ends. A cross-section taken traversely to a longitudinal axis of the tubular member has a generally oblong shape when the tubular member is filled with a fluid and a substantially flattened shape when the tubular member is not filled with a fluid. The tubular member has an outer surface colored a fluorescent color. A threaded female coupler is fluidly coupled to the first end and a threaded male coupler is fluidly coupled to the second end.

4 Claims, 2 Drawing Sheets

GARDEN HOSE ASSEMBLY

BACKGROUND OF THE INVENTION

1. Field of the Invention

The present invention relates to garden hose devices and more particularly pertains to a new garden hose device for providing a high visibility to a garden hose which is positioned on a ground surface.

2. Description of the Prior Art

The use of garden hose devices is known in the prior art. While these devices fulfill their respective, particular objectives and requirements, garden hoses have always presented a tripping danger for person not seeing the garden hose. The need remains for a device that retains a low profile while also providing high visibility to prevent a person from tripping over the hose.

SUMMARY OF THE INVENTION

The present invention meets the needs presented above by having a cross-section having an oblong shape when filled with water and a substantially flap shape when not filled. This shapes helps to prevent tripping on the hose should a person strike the hose with their foot.

Another object of the present invention is to provide a new garden hose device that is colored brightly to provide a high visibility of the hose. The high visibility aids a person in seeing the hose to again prevent tripping on the hose.

To this end, the present invention generally comprises an elongated and flexible tubular member that includes an open first end, an open second end and a peripheral wall extending between the first and second open ends. A cross-section taken traversely to a longitudinal axis of the tubular member has a generally oblong shape when the tubular member is filled with a fluid and a substantially flattened shape when the tubular member is not filled with a fluid. The tubular member has an outer surface colored a fluorescent color. A threaded female coupler is fluidly coupled to the first end and a threaded male coupler is fluidly coupled to the second end.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
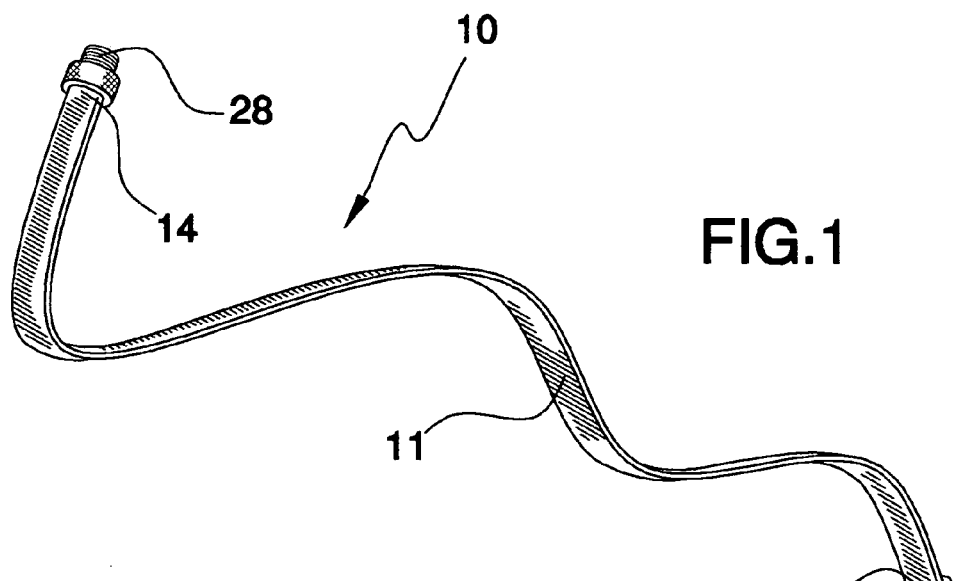
FIG. 1 is a schematic perspective view of a garden hose assembly according to the present invention.
Figure 2:
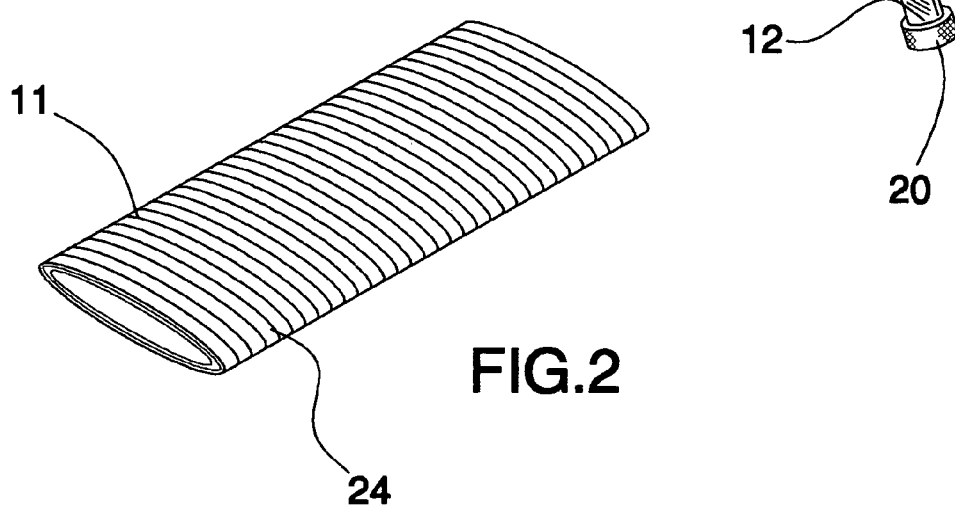
FIG. 2 is a schematic enlarged view of a portion of the hose of the present invention.

With reference now to the drawings, and in particular to FIGS. 1 through 4 thereof, a new garden hose device embodying the principles and concepts of the present invention and generally designated by the reference numeral 10 will be described.

Figure 3:
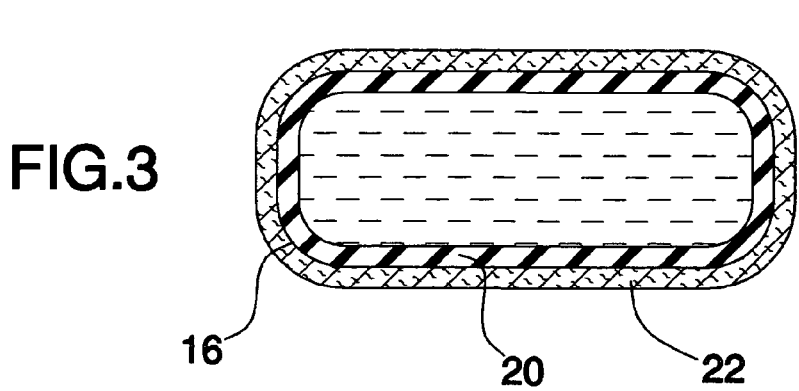
FIG. 3 is a schematic cross-sectional view of the present invention.
Figure 4:
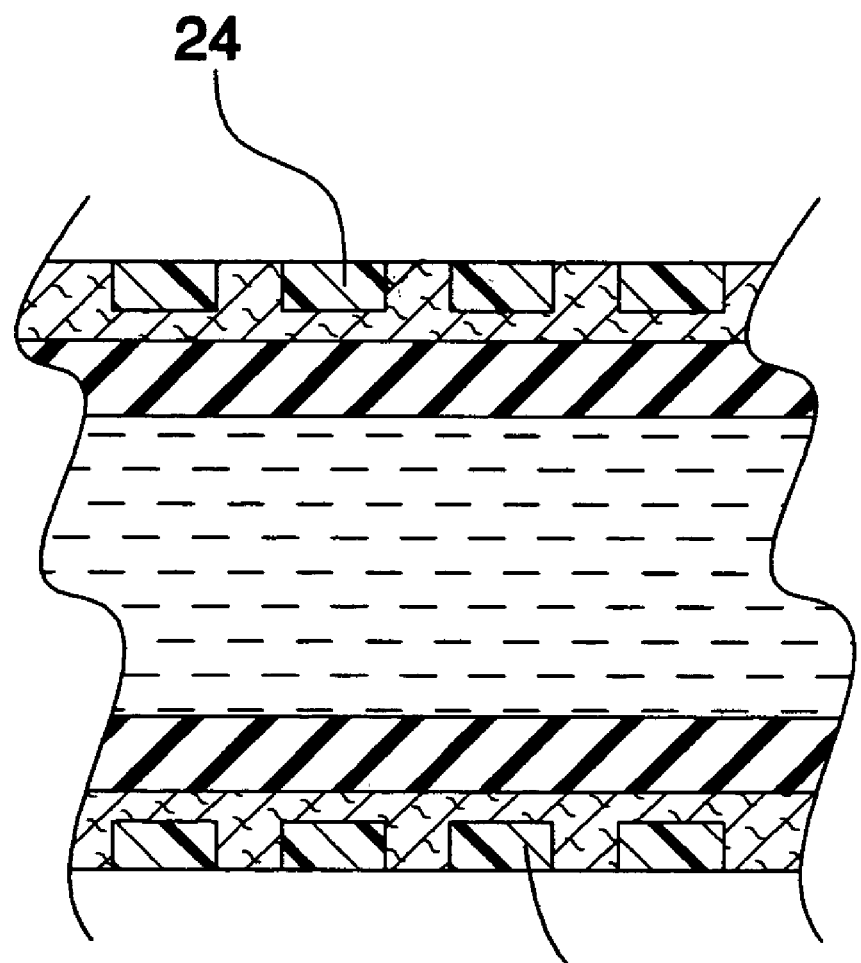
FIG. 4 is a schematic cross-sectional view of the present invention.

As best illustrated in FIGS. 1 through 4, the garden hose assembly 10 generally comprises an elongated and flexible tubular member 11 including an open first end 12, an open second end 14 and a peripheral wall 18 extending between the first 12 and second 14 open ends. A cross-section taken traversely to a longitudinal axis of the tubular member 11, as shown in FIG. 3, has a generally oblong shape when the tubular member 11 is filled with a fluid and a substantially flattened shape when the tubular member 11 is not filled with a fluid. The tubular member 11 has an outer surface colored a fluorescent color. The fluorescent color ideally comprises an orange color though yellow may also be used. Preferably, the peripheral wall 16 includes an inner layer 20 and an outer layer 22. The inner layer 20 comprises an elastomeric material while the outer layer 22 comprises a woven cloth material such as a plastic or wax coated nylon. The outer layer 22 reinforces the tubular member 11 while allowing it to retain its flexible properties.

A plurality of flexible bands 24 is attached to and extends around the tubular member 11. The bands 24 are spaced from each other preferably between 1 inch and 18 inches and each preferably has a width between ½ inch and 1½ inches. Preferably, each of the bands 24 is embedded in the outer surface of the tubular member 12 so that they are level with the outer surface. Each of the bands 24 is covered with a reflective coating that is colored either white or yellow.

A threaded female coupler 26 is fluidly coupled to the first end 12 and a threaded male coupler 28 is fluidly coupled to the second end 14. The male 28 and female 26 couplers are conventional garden hose couplers.

In use, the assembly 10 is used as a conventional garden hose. However, the coloring of the tubular member 11 and its shape aid in preventing a person from tripping over the tubular member 11 when it is positioned on a ground surface.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A garden hose device comprising:
   an elongated and flexible tubular member including an open first end, an open second end and a peripheral wall extending between said first and second open ends, a cross-section taken traversely to a longitudinal axis of said tubular member having a generally oblong shape when said tubular member is filled with a fluid and a substantially flattened shape when said tubular member is not filled with a fluid, said tubular member having an outer surface colored a single fluorescent color;

further including a plurality of uniform flexible bands being attached to and extending around said tubular member, said bands being spaced from each other a distance generally between 1 inch and 18 inches, each of said bands being embedded in and forming a smooth surface relative to said outer surface, each of said bands being covered with a reflective coating; and a threaded female coupler being fluidly coupled to said first end, a threaded male coupler being fluidly coupled to said second end.

2. The device of claim 1, wherein said peripheral wall includes an inner layer and an outer layer, said inner layer comprising an elastomeric material, said outer layer comprising a woven cloth material.

3. A garden hose device comprising:

an elongated and flexible tubular member including an open first end, an open second end and a peripheral wall extending between said first and second open ends, a cross-section taken traversely to a longitudinal axis of said tubular member having a generally oblong shape when said tubular member is filled with a fluid and a substantially flattened shape when said tubular member is not filled with a fluid;

a plurality of flexible bands being attached to and extending around said tubular member, said bands being spaced from each other a distance generally between 1 inch and 18 inches, each of said bands being embedded in and forming a smooth surface relative to said outer surface, each of said bands being covered with a reflective coating; and a threaded female coupler being fluidly coupled to said first end, a threaded male coupler being fluidly coupled to said second end.

4. A garden hose device comprising:

an elongated and flexible tubular member including an open first end, an open second end and a peripheral wall extending between said first and second open ends, a cross-section taken traversely to a longitudinal axis of said tubular member having a generally oblong shape when said tubular member is filled with a fluid and a substantially flattened shape when said tubular member is not filled with a fluid, said tubular member having an outer surface colored a fluorescent color, said fluorescent color comprising an orange color, said peripheral wall including an inner layer and an outer layer, said inner layer comprising an elastomeric material, said outer layer comprising a woven cloth material;

a plurality of flexible bands being attached to and extending around said tubular member, said bands being spaced from each other a distance generally between 1 inch and 18 inches, each of said bands being embedded in and forming a smooth surface relative to said outer surface, each of said bands being coved with a reflective coating; and a threaded female coupler being fluidly coupled to said first end, a threaded male coupler being fluidly coupled to said second end.

* * * * *